US012688839B2

(12) United States Patent
Cheng et al.

(10) Patent No.: US 12,688,839 B2
(45) Date of Patent: Jul. 21, 2026

(54) DRIVING SEQUENCES FOR REDUCING IMAGE GHOSTING IN MULTI-PARTICLE ELECTROPHORETIC DISPLAYS

(71) Applicant: E Ink Corporation, Billerica, MA (US)

(72) Inventors: Chih-Yu Cheng, Taipei (TW); Ning-Wei Jan, New Taipei (TW); Jing-Po Tsao, Jhubei (TW); Chen-Kai Chiu, Taoyuan (TW); Craig Lin, Fremont, CA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/096,885

(22) Filed: Apr. 1, 2025

(65) Prior Publication Data

US 2025/0322811 A1 Oct. 16, 2025

Related U.S. Application Data

(60) Provisional application No. 63/632,717, filed on Apr. 11, 2024.

(51) Int. Cl.
*G09G 3/38* (2006.01)

(52) U.S. Cl.
CPC ....... *G09G 3/38* (2013.01); *G09G 2300/0452* (2013.01); *G09G 2310/065* (2013.01); *G09G 2320/0257* (2013.01)

(58) Field of Classification Search
CPC ............. G09G 2300/0452; G09G 3/38; G09G 2320/0257; G09G 3/2003; G09G 2320/0242; G09G 3/344; G09G 2310/065; G09G 2310/068
See application file for complete search history.

(56) References Cited

U.S. PATENT DOCUMENTS

| | | | | |
|---|---|---|---|---|
| 9,013,516 | B2 | 4/2015 | Sakamoto et al. | |
| 9,285,649 | B2 | 3/2016 | Du et al. | |
| 11,699,406 | B2 | 7/2023 | Ma et al. | |
| 11,747,701 | B2 | 9/2023 | Telfer et al. | |
| 11,830,449 | B2 | 11/2023 | Lin | |
| 2007/0164982 | A1 * | 7/2007 | Zhou | G09G 3/344 345/107 |
| 2007/0206262 | A1 * | 9/2007 | Zhou | G09G 5/14 359/267 |
| 2022/0406264 | A1 * | 12/2022 | Lin | G09G 3/344 |

OTHER PUBLICATIONS

European Patent Office, "International Search Report and Written Opinion", PCT/US2025/022542, Jun. 25, 2025.

* cited by examiner

*Primary Examiner* — Muhammad N Edun
(74) *Attorney, Agent, or Firm* — Rajesh Vallabh

(57) ABSTRACT

Multi-particle electrophoretic displays, including three and four-particle displays, and methods of driving such displays with waveforms having shaking pulses configured to reduce or eliminate image ghosting.

20 Claims, 15 Drawing Sheets

FIG. 10

| Waveform Type | KS-ΔE | WS-ΔE | RS-ΔE | YS-ΔE | BS-ΔE | GS-ΔE |
|---|---|---|---|---|---|---|
| FIG. 9 Shaking Pulses | 2.04 | 1.38 | 0.47 | 0.47 | 0.79 | 1.30 |
| FIG. 10 Shaking Pulses | 1.17 | 1.23 | 0.36 | 0.47 | 0.75 | 1.32 |

Shaking pulses 82

Shaking pulses 84

Shaking pulses 90

Shaking pulses 92

| Waveform Type | KS-ΔE | WS-ΔE | RS-ΔE | YS-ΔE | BS-ΔE | GS-ΔE |
|---|---|---|---|---|---|---|
| FIG. 13 Shaking Pulses | 3.56 | 1.90 | 4.56 | 0.89 | 1.88 | 3.43 |
| FIGS. 15-20 Shaking Pulses | 1.78 | 0.56 | 1.31 | 0.42 | 1.33 | 1.31 |

DRIVING SEQUENCES FOR REDUCING IMAGE GHOSTING IN MULTI-PARTICLE ELECTROPHORETIC DISPLAYS

CROSS REFERENCE TO RELATED APPLICATION(S)

This application claims priority from U.S. Provisional Patent Application No. 63/632,717 filed on Apr. 11, 2024 entitled DRIVING SEQUENCES FOR REDUCING IMAGE GHOSTING IN MULTI-PARTICLE ELECTROPHORETIC DISPLAYS, which is hereby incorporated by reference in its entirety.

BACKGROUND

The present invention generally relates to driving methods for color electrophoretic display devices providing high-quality color states with reduced image ghosting.

Electrophoretic displays (electronic paper, ePaper, etc.), such as commercially-available displays from E Ink Holdings (Hsinchu, Taiwan), have advantages of being light, durable, and eco-friendly because they consume very little power. The technology has been incorporated into electronic readers (e.g., electronic books or eBooks) and other display environments (e.g., phones, tablets, electronic shelf tags, hospital signage, road signs, and mass transit time tables). The combination of low power consumption and sunlight readability has allowed for rapid growth in so called "no-plug and play" operations in which a digital signage system is merely attached to a surface and interfaces with exiting communication networks to provide regular updates of information or images. Because the display is powered with a battery or solar collector, there is no need to run utilities or even have a plug dangling from the display.

A variety of color options for electrophoretic displays have recently become available, ranging from improved color filter arrays, to complex subtractive pigment sets, to high-fidelity color options that rely on multiple sets of reflective color particles. This last system has seen great acceptance for commercial signage, such as in food stores, clothiers, and electronics retailers. In particular, three-color electrophoretic displays of the type described in U.S. Pat. No. 11,500,261 have been rapidly adopted for outdoor and indoor signage, and for room-temperature as well as refrigerated food sections. U.S. Pat. No. 11,500,261 is incorporated herein by reference in its entirety.

Three-particle electrophoretic displays are disclosed in U.S. Pat. Nos. 11,500,261; 8,717,664; 10,162,242; and 10,339,876. Four-particle electrophoretic displays are described in U.S. Pat. Nos. 9,285,649; 9,513,527; and 9,812,073.

Such multi-particle electrophoretic displays can suffer from image "ghosting" phenomena. Ghosting refers to the presence of faint copies or traces of previous images still visible on a display after it has been rewritten. Ghosting contributes to poor display quality and can be distracting to users. A need exists for improved methods of driving multi-particle electrophoretic displays, particularly three and four-particle displays, to high-quality color states with reduced ghosting.

SUMMARY

The driving methods disclosed herein address multi-particle electrophoretic displays, particularly three and four-particle electrophoretic displays, to generate high-quality color states with reduced ghosting.

In a first aspect of the invention, a method is disclosed for driving an electrophoretic display layer to desired optical states with reduced image ghosting. The electrophoretic display layer is disposed between a viewing surface including a light-transmissive electrode layer and a second opposite surface including a driving electrode layer. The display layer includes an electrophoretic medium comprising a non-polar fluid and at least three types of particles dispersed in the non-polar fluid. The at least three types of particles have different optical characteristics from one another. The method comprises the following steps for each pixel of the electrophoretic display layer: (a) applying a shaking voltage pulse sequence to a pixel for a first period of time to promote mixing of the at least three types of particles dispersed in the non-polar fluid, the shaking voltage pulse sequence comprising, in order, a first series of shaking voltage pulses, a second series of shaking voltage pulses, a third series of shaking voltage pulses, and a fourth series of shaking voltage pulses, wherein each series of shaking voltage pulses comprises alternating positive and negative voltage pulses repeated a plurality of times, and wherein the voltage pulses of the second and third series have the same frequency, the voltage pulses of the first series have a higher frequency than the voltage pulses of the second and third series, and the voltage pulses of the fourth series have a lower frequency than the voltage pulses of the second and third series; and (b) applying a push-pull voltage pulse sequence to the pixel for a second period of time following the first period of time to drive the pixel to a targeted color state at the viewing side of the display layer.

In one or more embodiments, the at least three types of particles comprises first, second, third, and fourth types of particles, the first and third types of particles having charges of a first polarity and the second and fourth types of particles having charges of a second polarity opposite the first polarity, wherein the first type of particles has a greater charge magnitude than the third type of particles, and the second type of particles has a greater charge magnitude than the fourth type of particles.

In one or more embodiments, the first, second, third, and fourth types of particles are black, yellow, red, and white, respectively.

In one or more embodiments, the first polarity is positive, and the second polarity is negative.

In one or more embodiments, the at least three types of particles comprises first, second, and third types of particles dispersed in the non-polar fluid, the first and third types of particles having charges of a first polarity and the second type of particles having charges of a second polarity opposite the first polarity, wherein the first type of particles has a greater charge magnitude than the third type of particles.

In one or more embodiments, the electrophoretic display layer is encapsulated in microcapsules or sealed microcells.

In one or more embodiments, the shaking voltage pulses of the first, second, third, and fourth series of shaking voltage pulses have the same amplitude.

In one or more embodiments, the shaking voltage pulses of the first, second, third, and fourth series of shaking voltage pulses alternate between +15V and −15V.

In one or more embodiments, the shaking voltage pulses of the first, second, third, and fourth series of shaking voltage pulses have a frequency of about 25 Hz, 12.5 Hz, 12.5 Hz, and 3.125 Hz, respectively.

In one or more embodiments, the first, second, third, and fourth series of shaking voltage pulses are separated by zero voltage pauses.

In one or more embodiments, the first period of time is less than the second period of time.

In another aspect of the invention, a method is disclosed for driving an electrophoretic display layer to desired optical states with reduced image ghosting. The electrophoretic display layer is disposed between a viewing surface including a light-transmissive electrode layer and a second opposite surface including a driving electrode layer. The display layer includes an electrophoretic medium comprising a non-polar fluid and at least three types of particles dispersed in the non-polar fluid. The at least three types of particles have different optical characteristics from one another. The method comprises the following steps for driving each pixel of the electrophoretic display layer to a targeted color state: (a) selecting a waveform for driving a pixel to a targeted color state from a set of waveforms stored in a memory each for driving a pixel to a different color state, each of the set of waveforms comprising a shaking voltage pulse sequence to be applied for a first period of time to promote mixing of the at least three types of particles dispersed in the non-polar fluid followed by a push-pull voltage pulse sequence to be applied for a second period of time to drive the pixel to a targeted color state, wherein at least two of the waveforms in the set of waveforms have different shaking voltage pulse sequences, the shaking voltage pulse sequence for each waveform configured to reduce image ghosting in the targeted color state produced by the subsequent push-pull voltage pulse sequence in the waveform; and (b) applying the waveform selected in step (a) to drive the pixel to the targeted color state.

In one or more embodiments, the at least three types of particles comprises first, second, third, and fourth types of particles, the first and third types of particles having charges of a first polarity and the second and fourth types of particles having charges of a second polarity opposite the first polarity, wherein the first type of particles has a greater charge magnitude than the third type of particles, and the second type of particles has a greater charge magnitude than the fourth type of particles.

In one or more embodiments, the first, second, third, and fourth types of particles are black, yellow, red, and white, respectively.

In one or more embodiments, the first polarity is positive, and the second polarity is negative.

In one or more embodiments, the at least three types of particles comprises first, second, and third types of particles dispersed in the non-polar fluid, the first and third types of particles having charges of a first polarity and the second type of particles having charges of a second polarity opposite the first polarity, wherein the first type of particles has a greater charge magnitude than the third type of particles.

In one or more embodiments, the electrophoretic display layer is encapsulated in microcapsules or sealed microcells.

In one or more embodiments, the shaking voltage pulse sequence of one of the waveforms of the set of waveforms comprises multiple series of shaking voltage pulses, wherein each series of shaking voltage pulses comprises alternating positive and negative voltage pulses repeated a plurality of times, and wherein the positive and negative voltage pulses have asymmetric pulse widths.

In one or more embodiments, the positive voltage pulses have a pulse width of about 60 ms and the negative voltage pulses have a pulse width of about 20 ms, or wherein the positive voltage pulses have a pulse width of about 20 ms and the negative voltage pulses have a pulse width of about 60 ms.

In one or more embodiments, the shaking voltage pulses alternate between +15V and −15V.

In one or more embodiments, the shaking voltage pulse sequence of one of the waveforms of the set of waveforms comprises, in order, at least a first series of shaking voltage pulses, a second series of shaking voltage pulses, a third series of shaking voltage pulses, and a fourth series of shaking voltage pulses, wherein each series of shaking voltage pulses comprises alternating positive and negative voltage pulses repeated a plurality of times, and wherein the first and third series of shaking voltage pulses have a given frequency, and the second and fourth series of shaking voltage pulses have a frequency greater than the given frequency.

In one or more embodiments, the shaking voltage pulses alternate between +15V and −15V.

In one or more embodiments, the shaking voltage pulse sequence of one of the waveforms of the set of waveforms comprises, in order, at least a first series of shaking voltage pulses, a second series of shaking voltage pulses, a third series of shaking voltage pulses, and a fourth series of shaking voltage pulses, wherein the first and third series of shaking voltage pulses comprise pulses alternating between +15V and −15V repeated a plurality of times, and wherein the second and fourth series of shaking voltage pulses comprise pulses alternating between +15V and 0V repeated a plurality of times.

In one or more embodiments, the first and third series of shaking voltage pulses have a frequency of 12 Hz, and the second and fourth series of shaking voltage pulses have a frequency of 20 Hz.

In one or more embodiments, the shaking voltage pulse sequence of one of the waveforms of the set of waveforms comprises at least three series of shaking voltage pulses, each series of shaking voltage pulses comprising alternating positive and negative voltage pulses having a given pulse width repeated a plurality of times, wherein each series of shaking voltage pulses is separated by a single pulse having a pulse width greater than the given pulse width.

In one or more embodiments, the shaking voltage pulses alternate between +15V and −15V.

In one or more embodiments, each single pulse has an amplitude of +15V or −15V.

DETAILED DESCRIPTION

Figure 1:
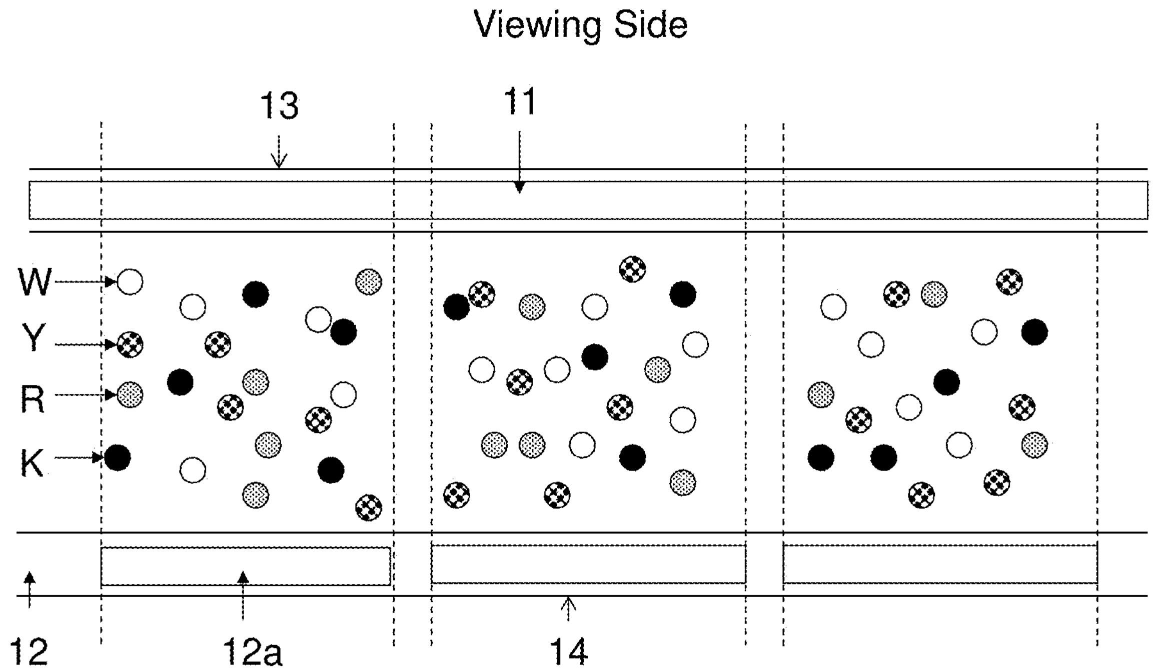
FIG. 1 PRIOR ART
FIG. 1 is a schematic cross-section through an exemplary electrophoretic display layer containing four different types of particles and capable of displaying four different color states.

The present invention relates to methods for driving electrophoretic display devices. Such devices include a display layer comprising an electrophoretic medium containing multiple types of particles (e.g., a four-particle system having first, second, third, and fourth types of particles) all having differing optical characteristics and dispersed in a non-polar fluid. These optical characteristics are typically colors perceptible to the human eye, but may be other optical properties, such as optical transmission, reflectance, and luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable. The invention also broadly encompasses other multi-particle electrophoretic media, including three-particle systems.

In a four-particle electrophoretic medium, the four types of particles may comprise two pairs of oppositely charged particles. The first pair (the first and second types of particles) consists of a first type of positive particles and a first type of negative particles; similarly, the second pair (third and fourth types of particles) consists of a second type of positive particles and a second type of negative particles. Of the two pairs of oppositely charged particles, one pair (the first and second particles) carries a stronger charge than the other pair (third and fourth particles). Therefore the four types of particles may also be referred to as high positive particles, high negative particles, low positive particles, and low negative particles.

The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913 and/or may be measured in terms of zeta potential. In one embodiment, the zeta potential is determined by Colloidal Dynamics AcoustoSizer IIM with a CSPU-100 signal processing unit, ESA EN # Attn flow through cell (K: 127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse™ 17000, available from Lubrizol Corporation, a Berkshire Hathaway company), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

As an example shown in FIG. 1, first, black particles (K) and second, yellow particles (Y) are the first pair of oppositely charged particles, and in this pair, the black particles are the high positive particles and the yellow particles are the high negative particles. Third, red particles (R) and fourth, white particles (W) are the second pair of oppositely charged particles, and in this pair, the red particles are the low positive particles and the white particles are the low negative particles.

In another example not shown, the black particles may be the high positive particles, the yellow particles may be the low positive particles, the white particles may be the low negative particles, and the red particles may be the high negative particles. In another example not shown, the black particles may be the high positive particles, the yellow particles may be the low positive particles, the white particles may be the high negative particles, and the red particles may be the low negative particles. In another example not shown, the black particles may be the high positive particles, the red particles may be the low positive particles, the white particles may be the high negative particles, and the yellow particles may be the high negative particles. Of course, any particular color may be replaced with another color as required for the application. For example, if a specific combination of black, white, green, and red particles were desired, the high negative yellow particles shown in FIG. 1 could be replaced with high negative green particles.

In addition, the color states of the four types of particles may be intentionally mixed. For example, yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

The particles are preferably opaque, in the sense that they should be light reflecting not light transmissive. It be apparent to those skilled in color science that if the particles were light transmissive, some of the color states appearing in the following description of specific embodiments would be severely distorted or not obtained. White particles are of course light scattering rather than reflective, but care should be taken to ensure that not too much light passes through a layer of white particles. For example, if in the white state shown in FIG. 2F, discussed below, the layer of white particles allowed a substantial amount of light to pass through, and be reflected from the black and yellow particles behind it, the brightness of the white state could be substantially reduced.

In some embodiments, the particles are primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

White particles may be formed from an inorganic pigment, such as $TiO_2$, $ZrO_2$, ZnO, $Al_2O_3$, $Sb_2O_3$, $BaSO_4$, $PbSO_4$ or the like. Black particles may be formed from Cl pigment black 26 or 28 or the like (e.g., manganese ferrite black spinel or copper chromite black spinel) or carbon black. The other colored particles (which are non-white and non-black) may be red, green, blue, magenta, cyan, yellow or any other desired colored, and may be formed from, e.g., CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. The colored particles may also be inorganic pigments, such as red, green, blue and yellow. Examples may include, but are not limited to, CI pigment blue 28, CI pigment green 50 and CI pigment yellow 227.

The non-polar fluid in which the four types of particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoroethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size that ranges from about 50 nm to about 800 nm. The larger particles may have a size that is about 2 to about 50 times, and more preferably about 2 to about 10 times, the sizes of the smaller particles.

An electrophoretic display normally comprises a layer of electrophoretic material and at least two other layers disposed on opposed sides of the electrophoretic material, one of these two layers being an electrode layer. In most such displays both the layers on opposed sides of the electrophoretic material are electrode layers, and one or both of the electrode layers are patterned to define the pixels of the display. For example, in a passive matrix system, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one display pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Numerous patents and applications assigned to or in the names of the Massachusetts Institute of Technology (MIT), E Ink Corporation, E Ink California, LLC, E Ink Holdings, Prime View International, and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see e.g., U.S. Pat. Nos. 7,002,728 and 7,679,814;
(b) Capsules, binders and encapsulation processes; see e.g., U.S. Pat. Nos. 6,922,276 and 7,411,719;
(c) Microcell structures, wall materials, and methods of forming microcells; see e.g., U.S. Pat. Nos. 7,072,095 and 9,279,906;
(d) Methods for filling and sealing microcells; see e.g., U.S. Pat. Nos. 7,144,942 and 7,715,088;
(e) Films and sub-assemblies containing electro-optic materials; see e.g., U.S. Pat. Nos. 6,982,178 and 7,839,564;
(f) Backplanes, adhesive layers and other auxiliary layers and methods used in displays; see e.g., U.S. Pat. Nos. 7,116,318 and 7,535,624;
(g) Color formation and color adjustment; see e.g., U.S. Pat. Nos. 7,075,502 and 7,839,564;

(h) Methods for driving displays; see e.g., U.S. Pat. Nos. 7,012,600 and 7,453,445;

(i) Applications of displays; see e.g., U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see e.g., U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see e.g., the aforementioned U.S. Patent Application Publication No. 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules, but instead are retained within a plurality of cavities formed within a carrier medium, typically a polymeric film. See, e.g., International Application Publication No. WO 02/01281 and U.S. Pat. No. 6,788,449.

Preferred embodiments of the invention will now be described in detail, though by way of illustration only, with reference to the accompanying drawings.

FIG. 1 is a schematic cross-section through one example of a display layer that can be driven by methods of the present invention. The display layer has two major surfaces, a first, viewing surface 13 (the upper surface as illustrated in FIG. 1) through which a user views the display, and a second surface 14 on the opposed side of the display layer from the first surface 13. The display layer comprises an electrophoretic medium comprising a fluid and first, black particles (K) having a high positive charge, second, yellow particles (Y) having a high negative charge, third, red particles (R) have a low positive charge, and fourth, white particles (W) having a low negative charge. It should be understood that the assignment of specific colors to specific charged particles is somewhat arbitrary and other color combinations could be substituted. Thus, the color displayed at the first surface 13 will depend upon which color is assigned to each charge/magnitude particle, e.g., the high positive charge particle. The display layer is provided with electrodes as known in the art for applying electric fields across the display layer, i.e., including two electrode layers, the first of which is a light-transmissive or transparent common electrode layer 11 extending across the entire viewing surface 13 of the display layer. This electrode layer 11 may be formed from indium tin oxide (ITO) or a similar light-transmissive conductor. The other electrode layer 12 is a layer of discrete pixel electrodes 12*a* on the second surface 14, these electrodes 12*a* defining individual pixel of the display, these pixels being indicated by dotted vertical lines in FIG. 1. Alternatively, the other electrode layer 12 could be a solid electrode, e.g., a metal foil, a graphite plane, or a conductive polymer. Alternatively, electrode layer 12 could also be a light-transmissive or transparent electrode layer, similar to transparent common electrode layer 11. (An electric field is created for a pixel by the potential difference between a voltage applied to the common electrode and a voltage applied to the corresponding pixel electrode.) The pixel electrodes 12*a* may form part of an active matrix driving system with, e.g., a thin film transistor (TFT) backplane, but other types of electrode addressing may be used provided the electrodes provide the necessary electric field across the display layer.

The pixel electrodes may be as described in U.S. Pat. No. 7,046,228. The pixel electrodes 12*a* may form part of an active matrix thin film transistor (TFT) backplane, but other types of electrode addressing, e.g., segmented electrodes, may be used provided the electrodes provide the necessary electric field across the display layer.

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity. The charges on the "high positive" particles and the "high negative" particles may be the same or different. Likewise, the amplitudes of the "low positive" particles and the "low negative" particles may be the same or different. In any specific electrophoretic fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

FIGS. 2A-2F illustrate the four color states that can be displayed at the viewing surface of each pixel of the display layer shown in FIG. 1 and the transitions between them. As previously noted, the high positive particles are of a black color (K); the high negative particles are of a yellow color (Y); the low positive particles are of a red color (R); and the low negative particles are of a white color (W).

Figures 2A, 2B:
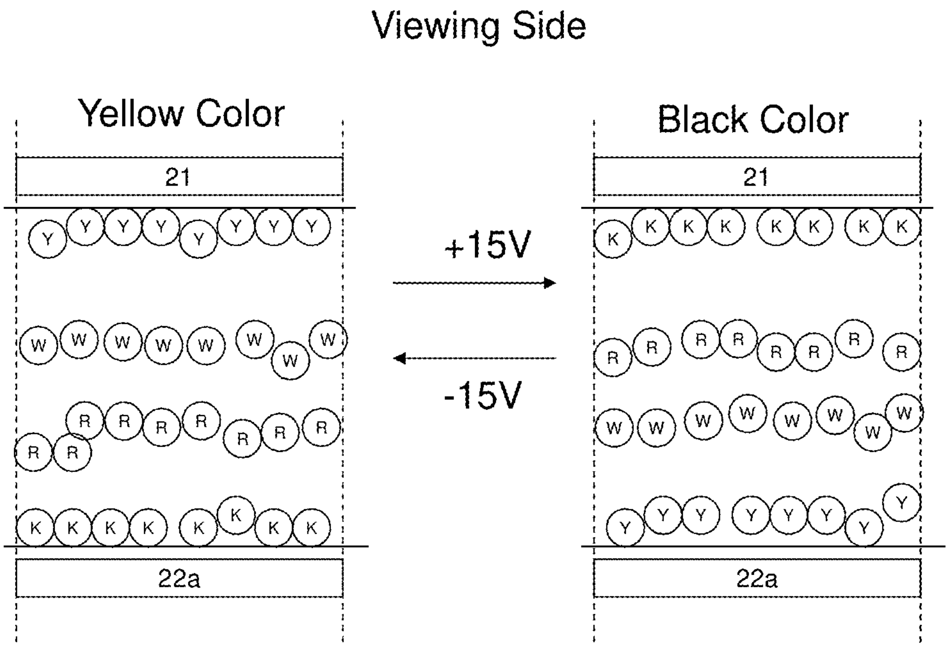
FIG. 2A PRIOR ART
FIG. 2B PRIOR ART
FIGS. 2A-2F are schematic cross-sections similar to those of FIG. 1 but illustrating changes in particle positions as a result of applying driving sequences of particular charge and polarity.

In FIGS. 2A and 2B, when a high negative driving voltage (referred to below as $V_{H2}$, e.g., −15V, e.g., −30V) is applied to the pixel electrode 22*a* (hereinafter, it will be assumed that the common electrode 21 will be maintained at 0V, so in this case the common electrode is strongly positive relative to the pixel electrode) for a time period of sufficient length, an electric field is generated to cause the high negative yellow particles to be driven adjacent the common electrode 21 and the high positive black particles driven adjacent the pixel electrode 22*a* to produce the state of FIG. 2A.

The low positive red (R) and low negative white (W) particles, because they carry weaker charges, move slower than the higher charged black and yellow particles and as a result, they stay in the middle of the pixel, with white particles above the red particles, and with both masked by the yellow particles and therefore not visible at the viewing surface. Thus, a yellow color is displayed at the viewing surface.

Conversely, when a high positive driving voltage (referred to below as $V_{H1}$, e.g., +15V, e.g., +30V) is applied to the pixel electrode 22*a* (so that the common electrode 21 is strongly negative relative to the pixel electrode) for a time period of sufficient length, an electric field is generated to cause the high positive black particles to be driven adjacent the common electrode 21 and the high negative yellow particles adjacent the pixel electrode 22*a*. The resulting state of FIG. 2B is the exact inverse of FIG. 2A and a black color is displayed at the viewing surface.

Figures 2C, 2D:
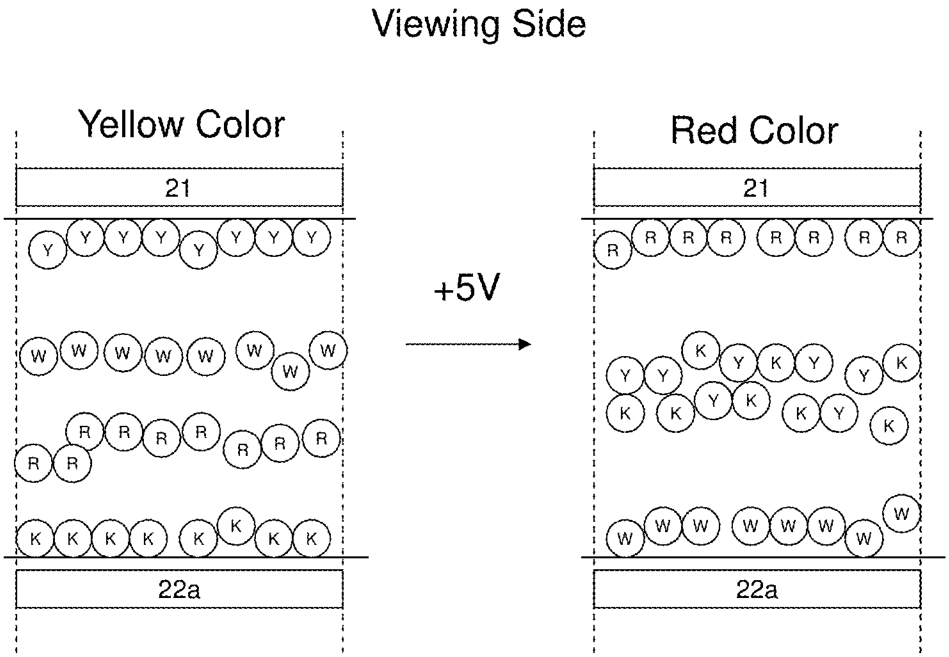
FIG. 2C PRIOR ART
FIG. 2D PRIOR ART

FIGS. 2C and 2D illustrate the manner in which the low positive (red) particles are displayed at the viewing surface of the display layer shown in FIG. 1. The process starts from the (yellow) state shown in FIG. 2A and repeated as FIG. 2C. A low positive voltage ($V_{L1}$, e.g., +3V, e.g., +5V, e.g., +10V) is applied to the pixel electrode 22*a* (i.e., the common electrode 21 is made slightly negative with respect to the pixel electrode) for a time period of sufficient length to cause the high negative yellow particles to move towards the pixel electrode 22*a* while the high positive black move towards the common electrode 21. However, when the yellow and black particles meet intermediate the pixel and common electrodes as shown in FIG. 2D, they remain at the intermediate position because the electric field generated by the low driving voltage is not strong enough to overcome the attractive forces between them. As shown, the yellow and black particles stay intermediate the pixel and common electrodes in a mixed state.

The term "attractive force" as used herein, encompasses electrostatic interactions, linearly dependent on the particle charge potentials, and the attractive force can be further enhanced by other forces, such as van der Waals forces, hydrophobic interactions and the like.

Obviously, attractive forces also exist between the low positive red particles and the high negative yellow particles, and between the low negative white particles and the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is also sufficient to separate the low negative white and low positive red particles, thereby causing the red particles to move adjacent the common electrode 21 and the white particles to move adjacent the pixel electrode 22*a*. As a result, the pixel displays a red color, while the white particles lie closest to the pixel electrode, as shown in FIG. 2D.

Figures 2E, 2F:
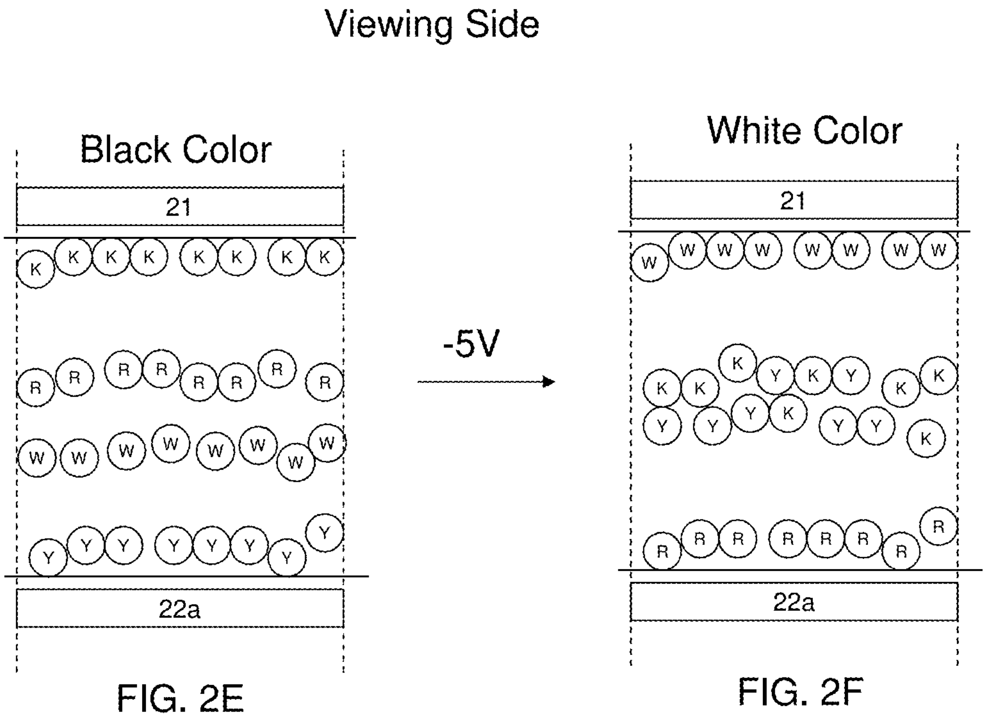
FIG. 2E PRIOR ART
FIG. 2F PRIOR ART

FIGS. 2E and 2F illustrate the manner in which the low negative (white) particles are displayed at the viewing surface of the display shown in FIG. 1. The process starts from the (black) state of FIG. 2B and repeated as FIG. 2E. A low negative voltage ($V_{L2}$, e.g., −3V, e.g., −5V, e.g., −10V) is applied to the pixel electrode (i.e., the common electrode is made slightly positive with respect to the pixel electrode) for a time period of sufficient length to cause the high positive black particles to move towards the pixel electrode 22*a*, while the high negative yellow particles move towards the common electrode 21. However, when the yellow and black particles meet intermediate the pixel and common electrodes as shown in FIG. 2F, they remain at the intermediate position because the electric field generated by the low driving voltage is not strong enough to overcome the attractive forces between them. Thus, as previously discussed with reference to FIG. 2D, the yellow and black particles stay intermediate the pixel and common electrodes in a mixed state.

As discussed above with reference to FIGS. 2C and 2D, attractive forces also exist between the low positive red particles and the high negative yellow particles, and between the low negative white particles and both the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode 21 and the red particles to move adjacent the pixel electrode 22*a*. As a result, the pixel displays a white color, while the red particles lie closest to the pixel electrode, as shown in FIG. 2F.

In the display layer shown in FIGS. 1 and 2A-2F, the black particles (K) carry a high positive charge, the yellow particles (Y) carry a high negative charge, the red (R) particles carry a low positive charge, and the white particles (W) carry a low negative charge. However in principle, the particles carrying a high positive charge, or a high negative charge, or a low positive charge or a low negative charge may be of any colors. All of these variations are intended to be within the scope of this application.

It should also be noted that the low potential difference applied to reach the color states of FIGS. 2D and 2F may be about 5% to about 50% of the high potential difference required to drive the pixel from the color state of high positive particles to the color state of the high negative particles, or vice versa, i.e., as shown in FIGS. 2A and 2B.

While, for ease of illustration, FIGS. 1 and 2A-2F show the display layer as unencapsulated, the electrophoretic fluid may be filled into display cells, which may be cup-like microcells as described in U.S. Pat. No. 6,930,818. The display cells may also be other types of micro-containers, such as microcapsules, microchannels, or equivalents, regardless of their shapes or sizes. All of these are within the scope of the present application.

It will readily be apparent to those skilled in imaging science that if "clean", well saturated colors are to be obtained in the various color states illustrated in FIGS. 2A-2F, all non-black and non-white particles used in the electrophoretic medium should be light-reflecting rather than light-transmissive. (White particles are inherently light-scattering, while black particles are inherently light-absorbing.) For example, in the red color state of FIG. 2D, if the red particles were substantially light-transmissive, a substantial proportion of the light entering the electrophoretic layer through the viewing surface would pass through the red particles and a proportion of this transmitted light would be reflected back from the yellow particles "behind" (i.e., below as illustrated in FIG. 2D) the red particles. The overall effect would be serious "contamination" of the desired red color with a yellow tinge, a highly undesirable result.

Figure 3:
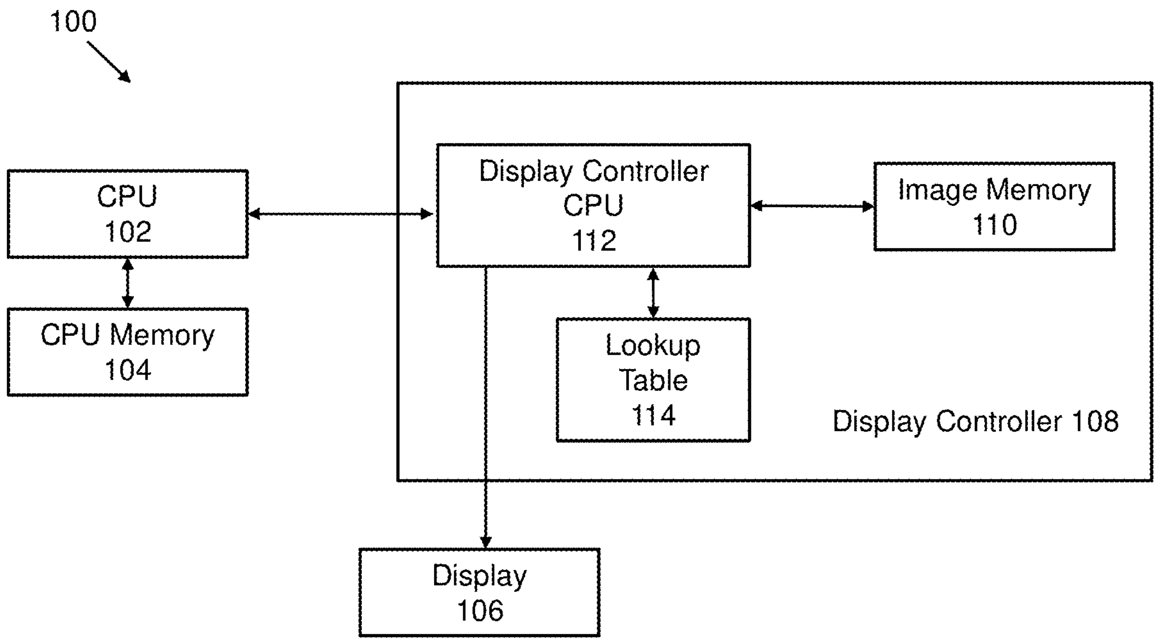
FIG. 3 PRIOR ART
FIG. 3 is a schematic block diagram illustrating driving components of an electrophoretic display device.

FIG. 3 is a schematic block diagram illustrating an exemplary electrophoretic display device 100, which includes a central processing unit (CPU) 102, CPU memory 104, an electrophoretic display 106, and a display controller 108. The display controller 108 includes a display controller CPU 112, a lookup table 114, and image memory 110. The CPU 102 can read to or write to CPU memory 104 via a computer bus. CPU memory 104 is sometimes referred to as the "main memory" in the system. In a display application, the images are stored in the CPU memory 104. When an image is to be displayed, the CPU 102 transfers image data from the CPU memory 104 via a computer bus to the display controller 108. The display controller CPU 112 stores the image data in the image memory 110 and consults the lookup table 114 to find the appropriate waveform to be applied for each pixel of the display based on the image data. The selected driving waveforms are then sent to the display 106 to drive the display to the desired image.

Figure 4:
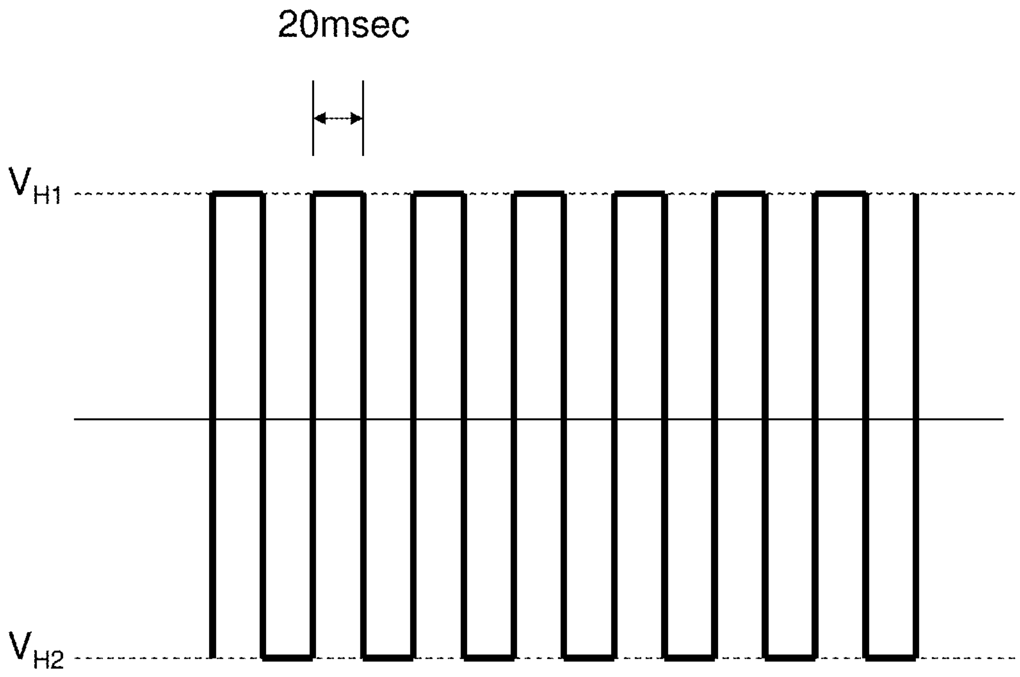
FIG. 4 PRIOR ART
FIG. 4 shows a generic "shaking" waveform, which can be used to mix and reset particles in driving sequences.

In order to ensure both color brightness and color purity, a shaking waveform may be applied prior to driving the display layer from one color state to another color state. FIG. 4 is a voltage versus time graph of one example of a prior art shaking waveform. The shaking waveform may comprise repeated pairs of opposite driving pulses for many cycles. When used with an active matrix display each positive or negative pulse is at least the frame width of an update. For example, each pulse width may be on the order of 16 msec, when a display is updated at 60 Hz. However, in fact, the frame times are typically a bit longer due to various charge and decay times for the capacitive elements of the backplane. For example, as shown in FIG. 4, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 4 illustrates only seven pairs of pulses.

The pulse width need not be limited to the frame time, and each pulse may include multiple frames, e.g., 40 msec pulse width, e.g., 60 msec pulse width, e.g., 80 msec pulse width, e.g., 100 msec pulse width. In some embodiments, the pulse width of each element of the shaking pulse may be 80 msec or less, e.g., 60 msec or less, e.g., 40 msec or less, e.g., 20 msec or less. In practice, there may be at least 4 repetitions (i.e., four pairs of positive and negative pulses), e.g., at least 6 repetitions, e.g., at least 8 repetitions, e.g., at least 10 repetitions, e.g., at least 12 repetitions, e.g., at least 15 repetitions. The shaking waveform may be applied regardless of the optical state prior to a driving voltage being applied. After the shaking waveform is applied, the optical state (at either the viewing surface or the second surface, if visible) will not be a pure color, but will be a mixture of the colors of the various types of pigment particles. In some instances multiple shaking pulses will be delivered with a pause of 0V between shaking pulses to allow the electrophoretic medium to equilibrate and/or allow accumulated charge on the electrodes to dissipate.

Each of the voltage pulses in the shaking waveform example of FIG. 4 is applied for not exceeding 50% (or not exceeding 30%, 10%, or 5%) of the driving time required for driving from the color state of the high positive particles to the color state of the high negative particles, or vice versa. For example, if it takes 300 msec to drive a display device from the color state of FIG. 2B to the high positive particles to the color state of FIG. 2A, or vice versa, the shaking waveform may consist of positive and negative pulses, each applied for not more than 150 msec. In practice, it is preferred that the pulses be shorter.

For present purposes, a high driving voltage ($V_{H1}$ or $V_{H2}$) is defined as a driving voltage that is sufficient to drive a pixel from the color state of high positive particles to the color state of high negative particles, or vice versa (see FIGS. 2A and 2B). A low driving voltage ($V_{L1}$ or $V_{L2}$) is defined as a driving voltage that may be sufficient to drive a pixel to the color state of low charged particles from the color state of high charged particles (see FIGS. 2D and 2F). In general, the magnitude of $V_L$ (e.g., $V_{L1}$ or $V_{L2}$) is less than 50%, or preferably less than 40%, of the amplitude of $V_H$ (e.g., $V_{H1}$ or $V_{H2}$).

Waveforms with Shaking Pulses Configured to Reduce Image Ghosting

One aspect of the invention relates to methods of driving multi-particle electrophoretic displays, including three and four-particle displays, with waveforms having shaking pulses configured to significantly reduce image ghosting.

Figure 5:
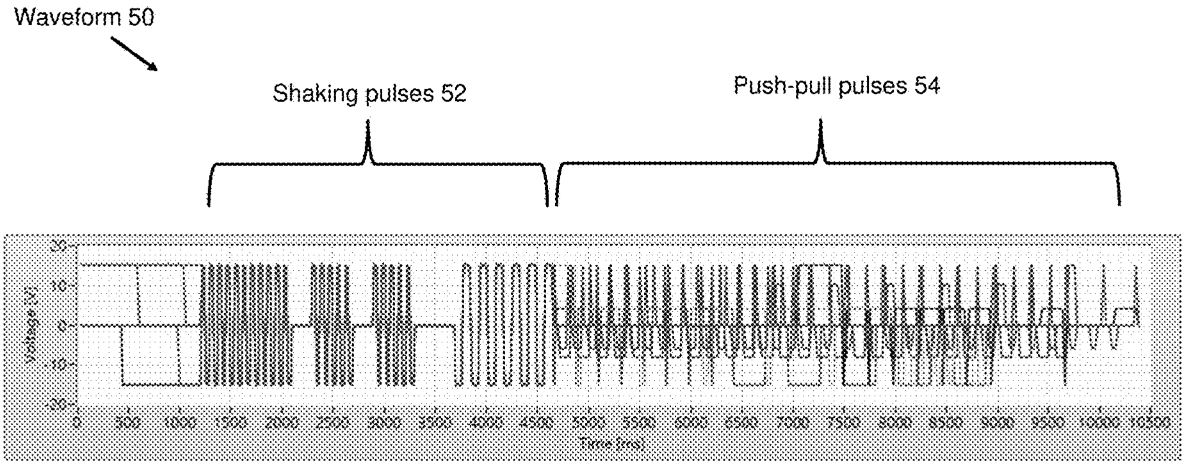
FIG. 5 PRIOR ART
FIG. 5 illustrates an example of a set of driving waveforms including a common shaking waveform component.
Figure 9:
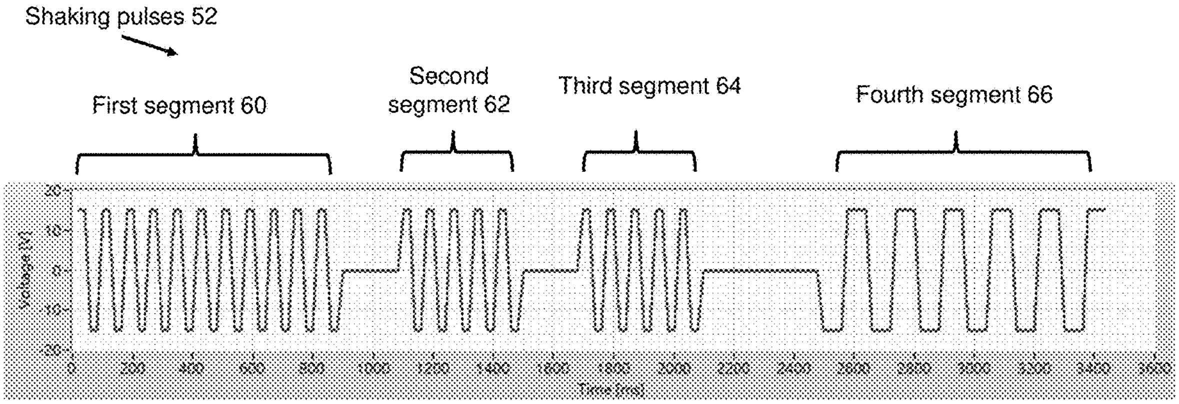
FIG. 9 PRIOR ART
FIG. 9 is an enlarged view of the shaking waveform depicted in FIG. 5.

FIG. 5 shows one example of a set of waveforms 50 used to drive a four-particle electrophoretic medium to black, white, red, yellow, blue, and green optical states. Each waveform 50 comprises a common set of shaking pulses 52 followed by particular sets of push-pull pulses 54 for driving the medium to desired color optical states. The shaking pulses 52 are intended to separate the particles from each other and promote uniform mixing of the particles so that the push-pull pulses 54 are applied to a mixed color state in which the particles are generally randomly distributed to more effectively drive the medium to targeted color optical states. As shown in the figure, the shaking pulses 52 are the same for all of the waveforms. The push-pull pulses 54 following the shaking pulses 52 vary and are shown in different colors corresponding to their respective targeted optical states. FIG. 9 is an enlarged view of the shaking pulses 52. As shown, the shaking pulses 52 comprises four segments of pulses 60, 62, 64, 66, each separated by a zero voltage pause to allow the electrophoretic medium to equilibrate and/or allow accumulated charge on the electrodes to dissipate.

Figure 6:
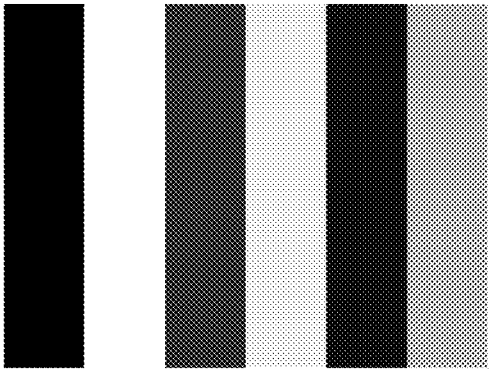
FIG. 6 depicts an image generated on a display comprising a set of vertical stripes of different colors (in order: black, white, red, yellow, blue, and green).
Figure 7:
FIG. 7 depicts an image generated on the display after the FIG. 6 image comprising a set of horizontal stripes of different colors (in order: black, white, red, yellow, blue, and green).
Figure 8:
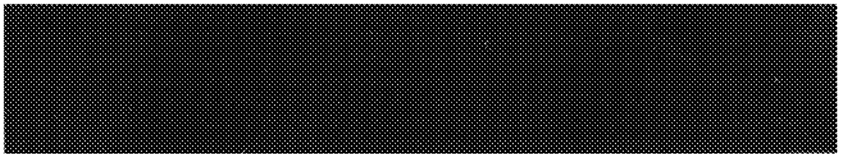
FIG. 8 is an enlarged view of the top black horizontal stripe in the image of FIG. 7.

Due to the limited time available in the waveform 50 for the shaking pulses 52, the electrophoretic particles might not be sufficiently mixed by the shaking pulses 52. Consequently, ghosting can occur when the display is driven from one color to another, e.g., as depicted in FIGS. 6-8. FIG. 6 shows an example of an initial image on the display comprising a set of vertical stripes of different colors (black, white, red, yellow, blue, and green). The image is the result of the display being driven to this optical state multiple times. Then, using waveforms 50 depicted in FIG. 5, the image of FIG. 7 was generated on the display comprising a set of horizontal stripes of different colors (black, white, red, yellow, blue, and green). The top black horizontal stripe of the image of FIG. 7 is shown enlarged in FIG. 8. The black area covers portions of the previously generated black, white, red, yellow, blue, and green areas from FIG. 6. The particles in the black area of FIGS. 7 and 8 are thus rearranged from multiple different initial color states to a single black optical state. Unless the shaking pulses of the FIG. 5 waveforms sufficiently uniformly mix the particles in each of the initial color states, traces of those colors (i.e., ghost images) may be present after the push-pull driving pulses as shown in FIG. 8.

Figure 10:
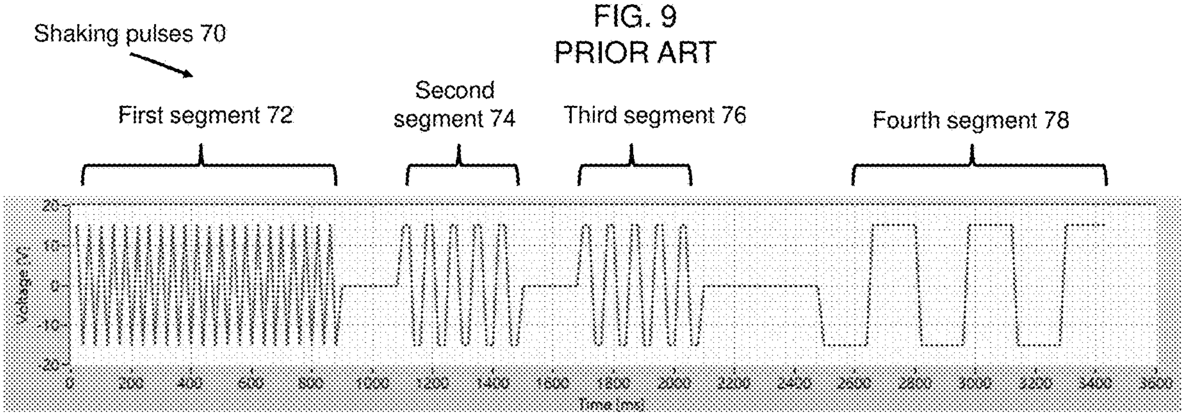
FIG. 10 illustrates an exemplary shaking pulse waveform configured to reduce ghosting in accordance with one or more embodiments.

One aspect of the invention relates to a particular configuration of shaking pulses designed to reduce image ghosting. Applicant has found that varying the frequency of the pulses in a shaking pulse sequence can result in more effective mixing of the particles in the electrophoretic medium regardless of their initial color optical state. The more uniform mixing removes image residues and enables the subsequent push-pull driving pulses to produce optical states with reduced ghosting. FIG. 10 illustrates an exemplary shaking pulse sequence 70 configured to reduce ghosting in accordance with one or more embodiments. The shaking pulse sequence 70 comprises a first segment 72, a second segment 74, a third segment 76, and a fourth segment 78, each separated by a zero voltage pause. The voltage pulses of the second and third segments 74, 76 have the same frequency. The voltage pulses of the first segment 72 have a higher frequency than the voltage pulses of the second and third segments 74, 76. The voltage pulses of the fourth segment 48 have a lower frequency than the voltage pulses of the second and third segments 74, 76. In one exemplary embodiment, the shaking voltage pulses of the first, second, third, and fourth segments 72, 74, 76, 78 have frequencies of about 25 Hz, 12.5 Hz, 12.5 Hz, and 3.125 Hz, respectively.

In one or more embodiments, the shaking voltage pulses of the first, second, third, and fourth segments 72, 74, 76, 78 have the same amplitude. For example, the shaking voltage pulses can alternate between about +15V and −15V.

In one or more embodiments, the shaking voltage pulses 70 are applied for a shorter period of time than the push-pull driving voltage pulses 54. For example, the shaking voltage pulses 70 are applied for about 3400 ms, and the push-pull driving voltage pulses 54 are applied for about 6000 ms.

Figures 11, 12:
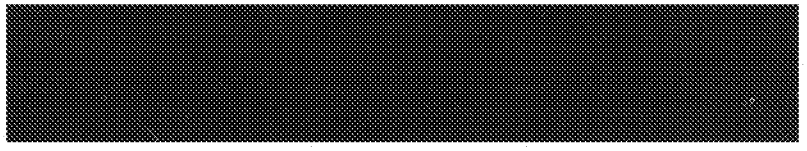
FIG. 11 shows a black image area with reduced ghosting generated using the shaking waveform of FIG. 10.
FIG. 12 is a table comparing the color properties of images generated using the shaking waveforms of FIGS. 9 and 10.

The shaking voltage pulses 70 of FIG. 10 have been found to better reset the particle distribution in the electrophoretic medium, leading to improved optical states by the subsequent push-pull driving voltage pulses 54. The varied frequency of the FIG. 10 shaking pulses compared to the pulses of FIG. 9 significantly reduces ghosting as shown, e.g., in FIG. 11, which shows a black area image similar to FIG. 8 but with significantly reduced or no visible color variation. The table of FIG. 12 provides test data showing reduced color variation using the shaking pulses of FIG. 10 compared to the pulses of FIG. 9, particularly in the final black optical state.

Another aspect of the invention relates to reducing image ghosting in multi-particle electrophoretic displays by using waveforms having different shaking voltage pulse sequences for different targeted color states. The shaking voltage pulse sequences may be varied from each other based, e.g., on the vibration mode, the number of shaking pulse segments, the shaking pulse frequencies, the shaking pulse amplitudes, and the shaking pulse widths.

Figure 13:
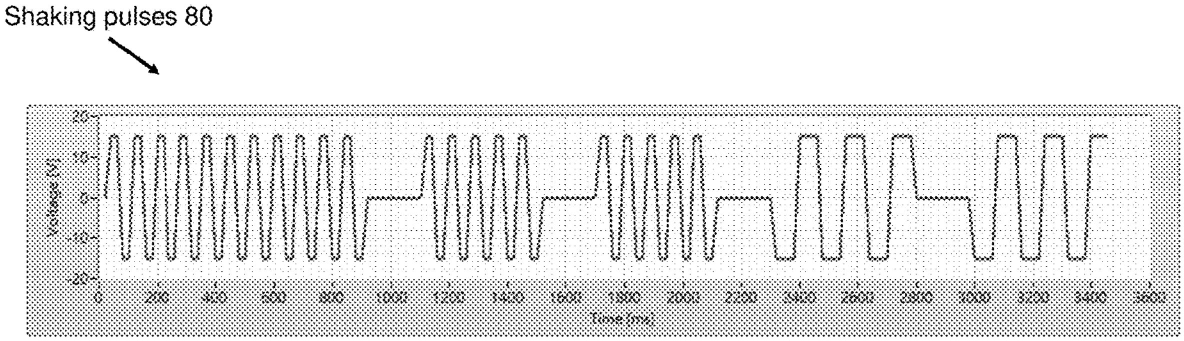
FIG. 13 PRIOR ART
FIG. 13 illustrates an example of a prior art shaking waveform.
Figure 14:
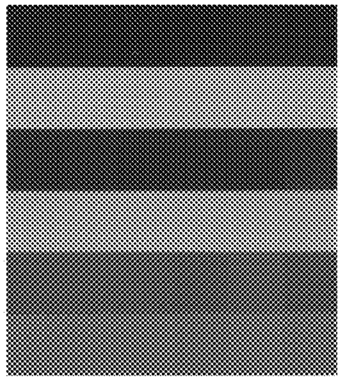
FIG. 14 depicts an image generated on the display comprising a set of horizontal stripes of different colors (in order: black, white, red, yellow, blue, and green) using the shaking waveform of FIG. 13.

FIG. 13 illustrates one prior art example of a single shaking waveform 80 used with multiple driving waveforms for different targeted color states. It has been found that image ghosting can occur when areas on a display having different colors are updated to a single color using the same shaking waveform 80, particularly in extreme operating temperatures, e.g., 50° C. FIG. 14, e.g., shows an image generated on the display comprising a set of horizontal stripes of different colors (black, white, red, yellow, blue, and green) updating an initial image on the display comprising a set of vertical stripes of different colors (black, white, red, yellow, blue, and green) similar to FIG. 6. Unless the shaking pulses of the FIG. 13 waveform sufficiently uniformly mix the particles in each of the initial color states, traces of those colors (i.e., ghost images) may be present after the push-pull driving pulses have been applied as shown in FIG. 14.

As discussed below, image ghosting can be significantly reduced by using multiple shaking waveforms, each specifically adapted to a particular push-pull waveform for producing a specific targeted color state. The shaking waveforms are adapted to ensure that the particles of each color are vibrated in a manner that best resets the particle distribution to produce a desired color state.

FIGS. 15-20 depict exemplary shaking waveforms 82, 84, 86, 88, 90, 92 for use with driving waveforms for producing targeted color states of black, white, red, yellow, blue, and green, respectively. At least some of the shaking waveforms 82, 84, 86, 88, 90, 92 are different from one another. In this example, only the white and blue shaking waveforms 84, 90 are the same.

Figure 15:
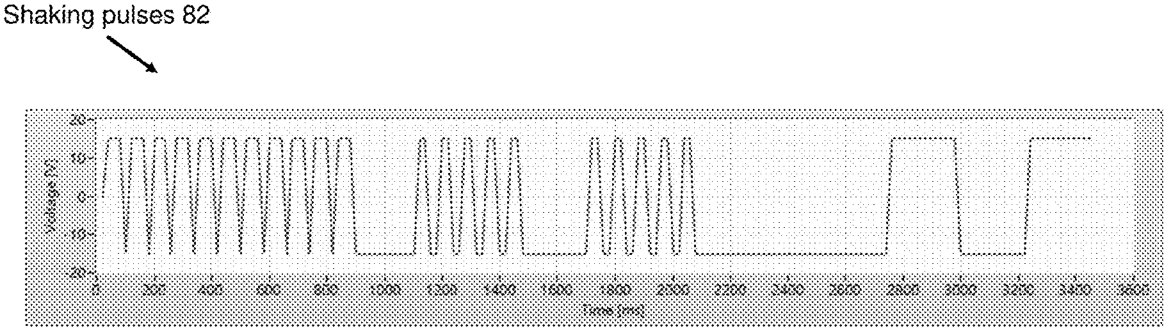
FIGS. 15-20 depict exemplary shaking waveforms in accordance with one or more embodiments for use with driving waveforms for producing targeted color states of black, white, red, yellow, blue, and green, respectively.

FIG. 15 depicts an exemplary shaking waveform 82 used for producing a black optical state. The waveform 82 comprises four series of positive and negative voltage pulses alternating between +15V and −15V. The voltage pulses have asymmetric pulse widths. In some embodiments, at least some of the positive voltage pulses have a pulse width of about 60 ms and the negative voltage pulses have a pulse width of about 20 ms. In other embodiments, at least some of the positive voltage pulses have a pulse width of about 20 ms and the negative voltage pulses have a pulse width of about 60 ms.

Figure 17:
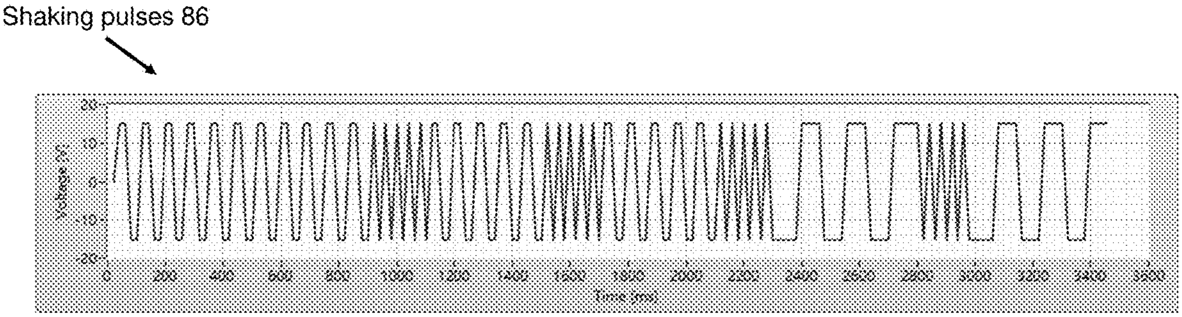

FIG. 17 depicts an exemplary shaking waveform 86 used for producing a red optical state. The waveform 86 comprises, in order, at least a first series of shaking voltage pulses, a second series of shaking voltage pulses, a third series of shaking voltage pulses, and a fourth series of shaking voltage pulses. Each series comprises positive and negative voltage pulses alternating between +15V and −15V. The first and third series of shaking voltage pulses have a frequency less than the frequency of the second and fourth series of shaking voltage pulses. In some embodiments, the first and third series of shaking voltage pulses have a frequency of about 12.5 Hz, and the second and fourth series of shaking voltage pulses have a frequency of about 20 Hz.

Figure 20:
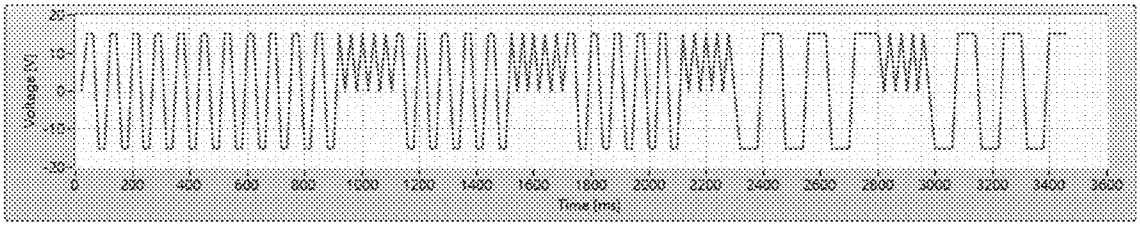

FIG. 20 depicts an exemplary shaking waveform 92 used for producing a green optical state. The waveform 92 comprises, in order, at least a first series of shaking voltage pulses, a second series of shaking voltage pulses, a third series of shaking voltage pulses, and a fourth series of shaking voltage pulses. The first and third series of shaking voltage pulses comprise pulses alternating between +15V and −15V. The second and fourth series of shaking voltage pulses comprise pulses alternating between +15V and 0V. The first and third series of shaking voltage pulses have a frequency of about 12.5 Hz, and the second and fourth series of shaking voltage pulses have a frequency of about 20 Hz.

Figure 16:
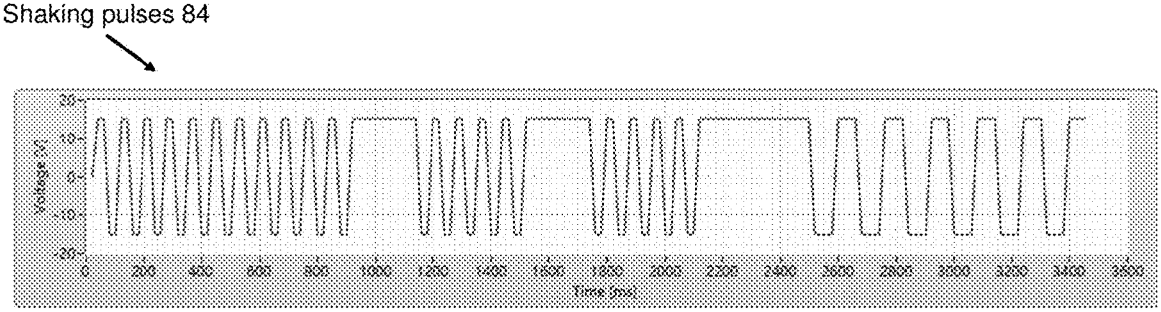
Figure 18:
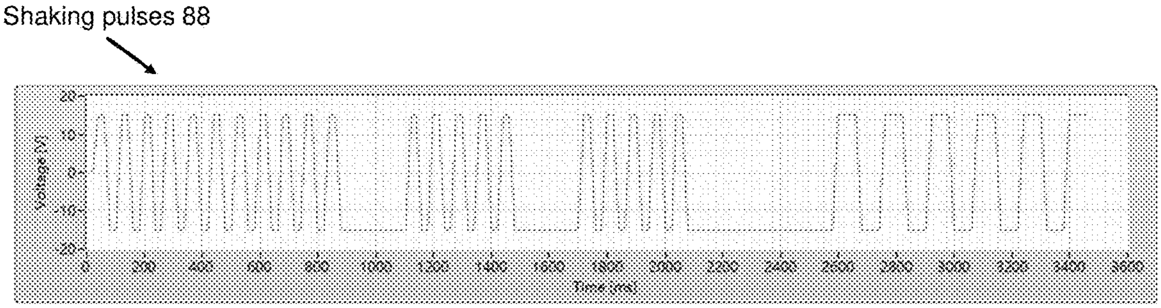
Figure 19:
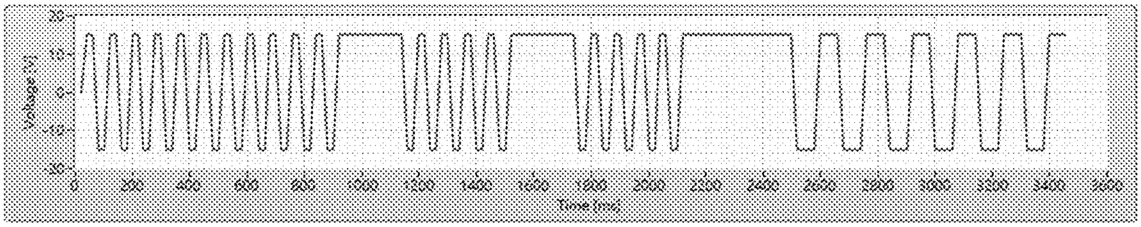

FIGS. 16, 18, and 19 depict exemplary shaking waveforms 84, 88, 90 used for producing white, yellow, and blue optical states, respectively. Each of the waveforms 84, 88, 90 comprises at least three series of alternating positive and negative voltage pulses having a given pulse width. Each series of shaking voltage pulses is separated by a single pulse having a pulse width greater than the given pulse width. The positive and negative voltage pulses alternate between +15V and −15V. The single pulse has an amplitude of +15V (for the blue and white waveforms 90, 84) or −15V (for the yellow waveform 88).

Figures 21, 22:
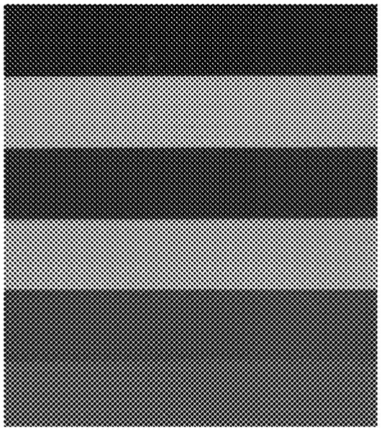
FIG. 21 depicts an image generated on the display comprising a set of horizontal stripes of different colors (in order: black, white, red, yellow, blue, and green) using the shaking waveform of FIGS. 15-20.
FIG. 22 is a table comparing the color properties of images generated using the shaking waveforms of FIG. 13 and FIGS. 15-20.

The shaking waveforms of FIGS. 15-20 significantly reduce ghosting compared to the single shaking waveform of FIG. 13 as shown, e.g., in the displayed image of FIG. 21, which has reduced or no visible color variation. The table of FIG. 22 provides test data showing reduced color variation using the shaking waveforms of FIGS. 15-20 compared to the single shaking waveform of FIG. 13.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A method of driving an electrophoretic display layer to desired optical states with reduced image ghosting, the electrophoretic display layer being disposed between a viewing surface including a light-transmissive electrode layer and a second opposite surface including a driving electrode layer, the display layer including an electrophoretic medium comprising a non-polar fluid and at least three types of particles dispersed in the non-polar fluid, the at least three types of particles having different optical characteristics from one another, the method comprising the following steps for each pixel of the electrophoretic display layer:

(a) applying a shaking voltage pulse sequence to a pixel for a first period of time to promote mixing of the at least three types of particles dispersed in the non-polar fluid, the shaking voltage pulse sequence comprising, in order, a first series of shaking voltage pulses, a second series of shaking voltage pulses, a third series of shaking voltage pulses, and a fourth series of shaking voltage pulses, wherein each series of shaking voltage pulses comprises alternating positive and negative voltage pulses repeated a plurality of times, and wherein the voltage pulses of the second and third series have the same frequency, the voltage pulses of the first series have a higher frequency than the voltage pulses of the second and third series, and the voltage pulses of the fourth series have a lower frequency than the voltage pulses of the second and third series; and (b) applying a push-pull voltage pulse sequence to the pixel for a second period of time following the first period of time to drive the pixel to a targeted color state at the viewing side of the display layer.

2. The method of claim 1, wherein the at least three types of particles comprises first, second, third, and fourth types of particles, the first and third types of particles having charges of a first polarity and the second and fourth types of particles having charges of a second polarity opposite the first polarity, wherein the first type of particles has a greater charge magnitude than the third type of particles, and the second type of particles has a greater charge magnitude than the fourth type of particles.

3. The method of claim 2, wherein the first, second, third, and fourth types of particles are black, yellow, red, and white, respectively.

4. The method of claim 1, wherein the at least three types of particles comprises first, second, and third types of particles dispersed in the non-polar fluid, the first and third types of particles having charges of a first polarity and the second type of particles having charges of a second polarity opposite the first polarity, wherein the first type of particles has a greater charge magnitude than the third type of particles.

5. The method of claim 4, wherein the first, second, and third, types of particles are black, red, and white, respectively.

6. The method of claim 1, wherein the shaking voltage pulses of the first, second, third, and fourth series of shaking voltage pulses have the same amplitude.

7. The method of claim 1, wherein the shaking voltage pulses of the first, second, third, and fourth series of shaking voltage pulses alternate between +15V and −15V.

8. The method of claim 1, wherein the shaking voltage pulses of the first, second, third, and fourth series of shaking voltage pulses have a frequency of about 25 Hz, 12.5 Hz, 12.5 Hz, and 3.125 Hz, respectively.

9. The method of claim 1, wherein the first, second, third, and fourth series of shaking voltage pulses are separated by zero voltage pauses.

10. The method of claim 1, wherein the first period of time is less than the second period of time.

11. An electrophoretic display device, comprising:

an electrophoretic display layer disposed between a viewing surface including a light-transmissive electrode layer and a second opposite surface including a driving electrode layer, the display layer including an electrophoretic medium comprising a non-polar fluid and at least three types of particles dispersed in the non-polar fluid, the at least three types of particles having different optical characteristics from one another;

a memory storing a set of waveforms for driving each pixel of the electrophoretic display layer to a targeted color state, each of the set of waveforms comprising a shaking voltage pulse sequence to be applied for a first period of time to promote mixing of the at least three types of particles dispersed in the non-polar fluid followed by a push-pull voltage pulse sequence to be applied for a second period of time to drive the pixel to the targeted color state, each shaking voltage pulse sequence comprising, in order, a first series of shaking voltage pulses, a second series of shaking voltage pulses, a third series of shaking voltage pulses, and a fourth series of shaking voltage pulses, wherein each series of shaking voltage pulses comprises alternating positive and negative voltage pulses repeated a plurality of times, and wherein the voltage pulses of the second and third series have the same frequency, the voltage pulses of the first series have a higher frequency than the voltage pulses of the second and third series, and the voltage pulses of the fourth series have a lower frequency than the voltage pulses of the second and third series; and a processor for selecting a waveform from the set of waveforms appropriate for driving each pixel to a desired color state and applying the waveform to the pixel.

12. A method of driving an electrophoretic display layer to desired optical states with reduced image ghosting, the electrophoretic display layer being disposed between a viewing surface including a light-transmissive electrode layer and a second opposite surface including a driving electrode layer, the display layer including an electrophoretic medium comprising a non-polar fluid and at least three types of particles dispersed in the non-polar fluid, the at least three types of particles having different optical characteristics from one another, the method comprising the following steps for driving each pixel of the electrophoretic display layer to a targeted color state:

(a) selecting a waveform for driving a pixel to a targeted color state from a set of waveforms stored in a memory each for driving a pixel to a different color state, each of the set of waveforms comprising a shaking voltage pulse sequence to be applied for a first period of time to promote mixing of the at least three types of particles dispersed in the non-polar fluid followed by a push-pull voltage pulse sequence to be applied for a second period of time to drive the pixel to a targeted color state, wherein at least two of the waveforms in the set of waveforms have different shaking voltage pulse sequences, the shaking voltage pulse sequence for each waveform configured to reduce image ghosting in the targeted color state produced by the subsequent push-pull voltage pulse sequence in the waveform; and (b) applying the waveform selected in step (a) to drive the pixel to the targeted color state.

13. The method of claim 12, wherein the at least three types of particles comprises first, second, third, and fourth types of particles, the first and third types of particles having charges of a first polarity and the second and fourth types of particles having charges of a second polarity opposite the first polarity, wherein the first type of particles has a greater charge magnitude than the third type of particles, and the second type of particles has a greater charge magnitude than the fourth type of particles.

14. The method of claim 13, wherein the first, second, third, and fourth types of particles are black, yellow, red, and white, respectively.

15. The method of claim 12, wherein the at least three types of particles comprises first, second, and third types of particles dispersed in the non-polar fluid, the first and third types of particles having charges of a first polarity and the second type of particles having charges of a second polarity opposite the first polarity, wherein the first type of particles has a greater charge magnitude than the third type of particles.

16. The method of claim 15, wherein the first, second, and third, types of particles are black, red, and white, respectively.

17. The method of claim 12, wherein the shaking voltage pulse sequence of one of the waveforms of the set of waveforms comprises multiple series of shaking voltage pulses, wherein each series of shaking voltage pulses comprises alternating positive and negative voltage pulses repeated a plurality of times, and wherein the positive and negative voltage pulses have asymmetric pulse widths.

18. The method of claim 17, wherein the positive voltage pulses have a pulse width of about 60 ms and the negative voltage pulses have a pulse width of about 20 ms, or wherein the positive voltage pulses have a pulse width of about 20 ms and the negative voltage pulses have a pulse width of about 60 ms.

19. The method of claim 12, wherein the shaking voltage pulse sequence of one of the waveforms of the set of waveforms comprises, in order, at least a first series of shaking voltage pulses, a second series of shaking voltage pulses, a third series of shaking voltage pulses, and a fourth series of shaking voltage pulses, wherein each series of shaking voltage pulses comprises alternating positive and negative voltage pulses repeated a plurality of times, and wherein the first and third series of shaking voltage pulses have a given frequency, and the second and fourth series of shaking voltage pulses have a frequency greater than the given frequency.

20. An electrophoretic display device, comprising:

an electrophoretic display layer disposed between a viewing surface including a light-transmissive electrode layer and a second opposite surface including a driving electrode layer, the display layer including an electrophoretic medium comprising a non-polar fluid and at least three types of particles dispersed in the non-polar fluid, the at least three types of particles having different optical characteristics from one another;

a memory storing a set of waveforms for driving each pixel of the electrophoretic display layer to a targeted color state, each waveform in the set of waveforms comprising a shaking voltage pulse sequence to be applied for a first period of time to promote mixing of the at least three types of particles dispersed in the non-polar fluid followed by a push-pull voltage pulse sequence to be applied for a second subsequent period of time to drive the pixel to a targeted color state, wherein at least two of the waveforms in the set of waveforms have different shaking voltage pulse sequences, the shaking voltage pulse sequence for each waveform configured to reduce image ghosting in the targeted color state produced by the subsequent push-pull voltage pulse sequence in the waveform; and a processor for selecting a waveform from the set of waveforms appropriate for driving each pixel to a desired color state and applying the waveform to the pixel.

* * * * *